Nov. 13, 1934.   H. F. KOENEKAMP   1,980,806
COMPOSITE MOTION PICTURES
Filed Aug. 17, 1932
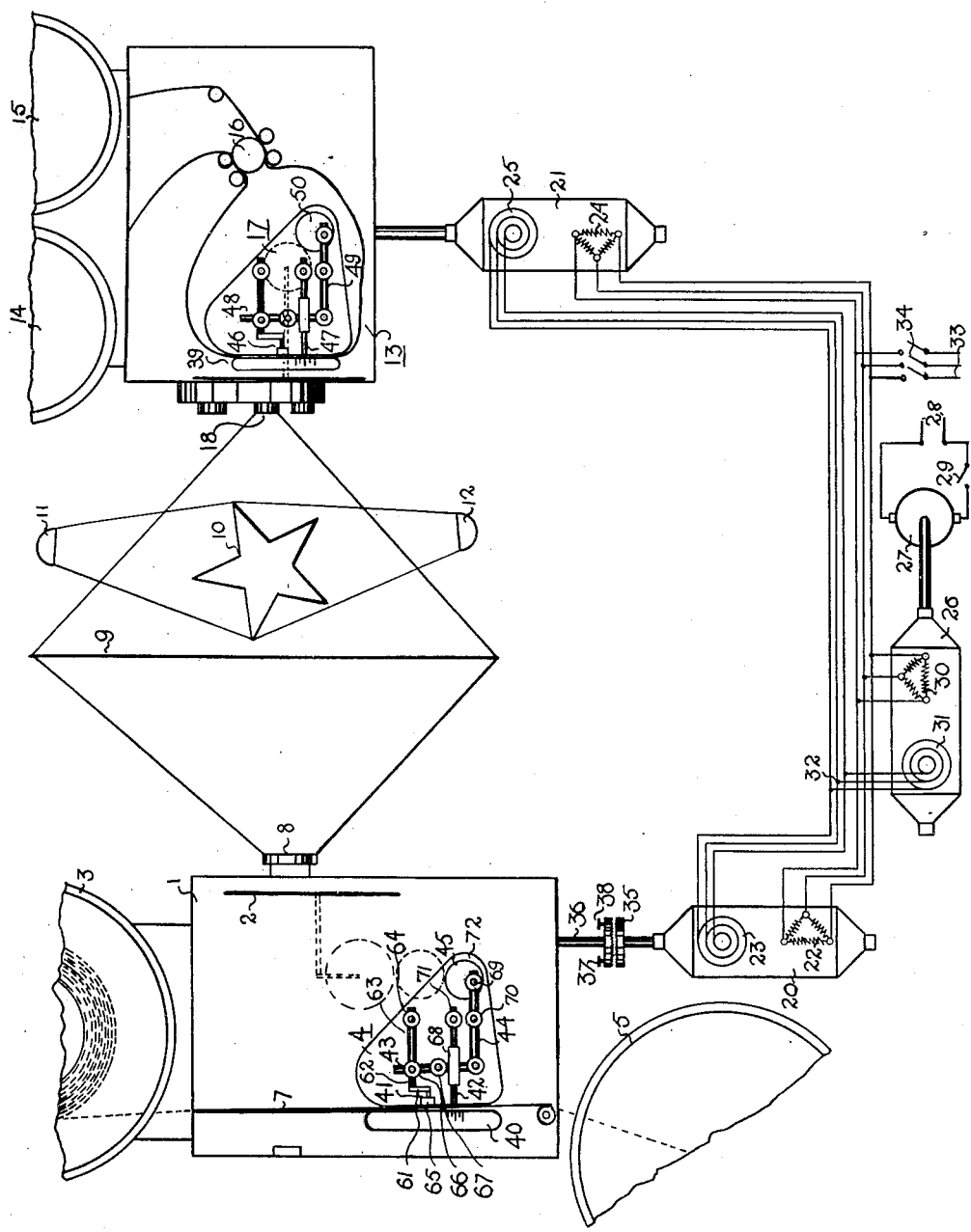
INVENTOR:
HANS F. KOENEKAMP
BY
ATTORNEY Patented Nov. 13, 1934

1,980,806

UNITED STATES PATENT OFFICE 1,980,806

COMPOSITE MOTION PICTURES

Hans F. Koenekamp, Venice, Calif., assignor to Warner Bros. Pictures, Inc., New York, N. Y., a corporation of Delaware Application August 17, 1932, Serial No. 629,123

3 Claims. (Cl. 88—16).

This invention relates to the art of photography and has to do with the making of composite motion pictures by the so-called translucent screen method.

This application is a continuation-in-part of the application, Serial No. 609,189, filed May 4, 1932 by Hans F. Koenekamp for Composite motion pictures.

As is well understood in the making of composite motion pictures by this method, a background scene is projected upon a translucent screen. In front of the translucent screen, the desired action takes place. This action, or foreground scene, is directed to correlate with the background scene as one will readily understand, and these two may be photographed at different times. A camera, operated in synchronism with the projector, photographs the foreground action in front of the background scene as projected on the translucent screen, and so a composite motion picture is formed.

However, if in the operation of this device, there is the slightest discrepancy between the pull-down or film advancing mechanisms of the projector and the camera or the instant stop and registering of the two films before they are once again advanced a frame, only a partial picture may be obtained. This is due to the fact that as the film in the projector is registered and remains stationary to allow a picture frame to be reproduced on the screen, the camera film may be, at that instant, advancing across the film gate or ready to move forward one frame and so only half an exposure will be obtained. In the extreme cases where the two films are completely out of register and the two pull-down mechanisms out of synchronism, no picture of the background scene will be obtained at all.

During the taking of the first composite motion pictures, it was found practically impossible to obtain isochronal relation between the films in the camera and the projector so that a frame of each film was registered and a clear picture, free from the defect above mentioned, obtained. The invention overcomes this difficulty by obtaining isochronal relation between the films in the camera and the projector.

This is accomplished by setting the intermittent movements and register pins therefor (i. e. pull-down or film advancing mechanisms) of both the projector and the camera at corresponding positions before the scene is taken, and by locking these movements and register pins in this adjusted position, thus insuring that during the taking of a scene the two intermittent movements and register pins will always operate, not only in synchronism, but also in the same phase relation so that a picture frame will be projected and a negative frame exposed simultaneously.

Other objects and structural details of this invention will appear in the following description when read in conjunction with the accompanying drawing, wherein:

Fig. 1 is a diagrammatic view showing a preferred arrangement of the various equipment used in this invention.

In order to isochronize the intermittent movements and register pins of a motion picture projector and camera, which are to be run in synchronism, it has been found expedient to introduce an adjustable lock between the two movements so that they may be relatively adjusted to corresponding positions and easily locked in these adjusted positions.

A typical projector 1 has a shutter 2 (which may be omitted), a film supply reel 3 for supplying a film carrying a background scene 7 (which may be a positive film or a so-called key negative) to an intermittent movement 4. This movement may be of any desired type, the one shown in the drawing being of that type disclosed and claimed in the co-pending application, Serial No. 602,728, filed April 2, 1932, by Albert W. Tondreau. This movement consists primarily of pilot or register pins 41 and pull-down pins 42. The pilot pins 41 are bolted to a bracket 61 which forms the outer edge of a fork 62. Suitably fastened to the center of the opposite edge of the fork 62 is a rod 63 slidably supported by a fixed bearing 64 fastened to the back plate 72. A bushing 65 is mounted adjacent the plate 40 opposite the film gate to receive the pilot pins 41 and to allow them to move only in a straight line. The pilot pins 41 are reciprocally moved by means of a link 43 that slides in a bearing 66 rotatably mounted in the center of the fork 62. Link member 43 is supported by a slide bearing 67 pivotally mounted on the plate 72 and is pivotally attached at its lower end to a driven connecting rod member 44. A shuttle fork 68 is pivotally connected to an intermediate point on the link member 43 in the center of the fork 68. Link member 43 rocks about the slide bearing 67 as a pivot point, the sliding connection 66 between this link and the pilot pin rod 63 being above the bearing 66 whereas the pivoted connection between the link 43 and shuttle fork 68, or pull-down member is below the bearing 66. The connecting rod member 44 is joined at one end to a pin member 69 mounted eccentrically on a disc or eccentric 45 and supported for reciprocal rocking motion by a slide bearing 70 mounted on the back plate 72. Rod 44 is pivotally connected to the lower end of link member 43.

Shuttle fork 68 is supported by a slide bearing 71 which point forms its center of rotation whereby a long, narrow arc of travel is imparted to the pull-down pins 42.

Eccentric 45 which imparts movement to the mechanism is driven by motor 20 through a conventional gear train (not shown).

The film 7 then passes to a take-up reel 5 in the usual manner. A lamphouse 6 provides a suitable source of illumination for the picture film 7 which is projected through an objective lens system 8 onto a translucent screen 9 in front of which the desired action 10 is to take place. Action 10 is lighted by any convenient lamps 11 and 12. The camera 13 is positioned to simultaneously photograph action 10 and the background scene projected on the translucent screen 9.

Camera 13 is an ordinary motion picture camera having supply and take-up reels 14 and 15 respectively for the film, a film advancing sprocket 16 and an intermittent movement 17 for advancing the film behind the objective lens 18, as will be well understood.

Film advancing mechanism 17, like mechanism 4, consists primarily of pilot or register pins 46, pull-down pins 47 actuated by a link movement consisting of two arms 48 and 49. The arm 49 is positively driven by the eccentric 50 which imparts movement to the rest of the mechanism as described in connection with mechanism 4. The eccentric 50 is driven by a camera motor in the conventional manner, as will be well understood.

The action 10 may consist of either an actor, or of a plurality of actors, or of performers of any sort, displaying their respective talents on a stage with suitable scenery (not shown) located between the screen 9 and the camera 13.

The projector 1 and the camera 13 are synchronously connected by a three-phase electrical interlock. In order that the projector 1 and the camera 13 may operate in synchronism, these machines are driven by the synchronous motors 20 and 21 respectively. The motor 20 is provided with a three-phase field winding 22 and with three slip rings 23. The motor 21 is similarly provided with a three-phase field winding 24 and three slip rings 25.

The speed of rotation of the armatures of the machines 20 and 21 is controlled by means of a so-called distributor 26 which is driven at a suitable speed by the D. C. motor 27 connected to suitable supply mains 28 which are controlled by a switch 29.

The distributor 26 has a three-phase field winding 30 and the armature thereof is provided with three slip rings 31. It will be understood that the slip rings, 23, 25 and 31 are connected to separated points in their respective armature windings (not shown). Furthermore, these three sets of slip rings are inter-connected by the circuit 32.

The field windings 22, 24 and 30 are connected in parallel and are all energized from the three-phase power circuit 33 in which there is a switch 34.

The electrical interlock system as shown is substantially the same as that commonly employed for driving a camera motor in synchronism with a recorder, with the motors 20 and 31 operating in synchronism and at a speed set by the speed of the distributor 26. In order that this may be a constant speed, a suitable speed regulator may be provided for motor 27 as is well understood.

In using an electrical interlock system, as above described, for driving a projector in synchronism with a camera, it has been found that while the pull-down mechanisms, and register or pilot pins, for the camera and projector operate in synchronism, they very seldom operate in isochronous relation.

In order that the motion picture film in both the camera and projector may be held stationary by the pilot pins 46 and 41 respectively at the same moment, and in order that they may be in motion during identically the same period of time, through means of the pull-down pins 47 and 42, so that fresh picture frames are brought into the respective picture gates at precisely the same instant, the following arrangement is provided:

A clutch 35 is introduced in the drive shaft 36 between the motor 20 and the intermittent movement 4, in the projector 1, and the intermittent movement 17 in the camera 13, so that when these two intermittent movements 4 and 17 have been adjusted initially to a corresponding position, the clutch 35 is locked by means of the screws 37 and 38 and the apparatus is ready for photographing.

In the operation of this device, when the switch 34 is closed, the field windings of the motors 20, 27 and 21 are energized and the armatures of these motors will give a jump or, in other words, rotate slightly to a position of least magnetic reluctance in their respective fields and either jump forward or backward slightly.

This instant jump naturally moves the intermittent movements a corresponding slight amount and it is very rare indeed that both motors 20 and 21 will jump to the same position, and so the film guide plate 39 in the camera 13 is calibrated to indicate these jumps and the film guide plate 40 in the projector 1 is similarly calibrated, each adjacent the pull-down pins 47 and 42 respectively of the intermittent movements 17 and 4 respectively, so that when the field windings 22, 24 and 30 are energized the movements jump and the camera operator observes into what position the camera pull-down pins 47 have moved with respect to the scale 39 and communicates this information by telephone (not shown) to the projectionist who frees his clutch 35, which of course may be already free; he then moves his intermittent movement 4 with its respective pull-down pins 42 into a position on the scale 40 corresponding to the position assumed by the pins 47 in the camera 13. When this is accomplished he locks the clutch 35 and the device is ready for a composite picture to be photographed, with the assurance that the two movements will run in isochronous relation, i. e. the films in the camera and projector will be registered at precisely the same instant.

While I have shown and described a preferred form of calibrations for determining the relative positions of the two movements, it is to be understood that other moving parts of the camera and projector may be used for this purpose and other alterations and modifications may be made in the apparatus used for insuring that the films will advance and register in isochronal relation, without departing from the invention.

Having thus described the invention, what is claimed as new and desired to secure by Letters Patent is:

1. Photographic apparatus for making composite motion pictures comprising a motion picture camera, a motion picture projector, a translucent screen there-between, said camera being adapted to photograph action before said screen while motion pictures are projected thereon from said projector, a motor for said camera, a motor for said projector, said motors having field windings and armatures respectively, means for interconnecting said motors for synchronism, a film advancing mechanism for said projector and indicia for indicating the position of said film advancing mechanism, a set of register pins cooperating with said film advancing mechanism, a film advancing mechanism for said camera and indicia for indicating the position of said last mentioned film advancing mechanism, a set of register pins cooperating with said last mentioned film advancing mechanism, means for energizing said field windings to move said armatures into a definite starting position, and means for changing the driving relation between one of said film advancing mechanisms and register pins and its respective motor in accordance with said indicia whereby said film advancing mechanisms may be adjusted for synchronous operation.

2. Photographic apparatus for the making of composite motion pictures comprising a motion picture camera, a motion picture projector, a translucent screen there-between, said camera being adapted to photograph action before said screen while motion pictures are projected thereon from said projector, a motor for the camera, a motor for the projector, said motors being of the synchronous type and having field windings and armatures respectively; means for connecting said motors for synchronism, film advancing mechanism for said camera, and position indicating indicia therefor, film advancing mechanism for said projector, and position indicating indicia therefor, corresponding to said first-mentioned indicia, means for energizing said field windings to move said armatures into a definite starting position, and means for changing the driving relation between one of said film advancing mechanisms and its respective motor in accordance with said indicia, whereby said film advancing mechanisms may be adjusted for isochronous operation.

3. Photographic apparatus for the making of composite motion pictures comprising a motion picture camera, a motion picture projector, a translucent screen there-between, said camera being adapted to photograph action before said screen while motion pictures are projected thereon from said projector, a motor for the camera, a motor for the projector, said motors being of the synchronous type and having field windings and armatures respectively; means for connecting said motors for synchronism, film advancing mechanism for said camera, film advancing mechanism for said projector, means for energizing said field windings to move said armatures into a definite starting position, and means for changing the driving relation between one of said film advancing mechanisms and its respective motor to move said last-mentioned film advancing mechanism into the same start position as the start position of the other of said film advancing mechanisms.

HANS F. KOENEKAMP.